United States Patent
Maloney et al.

(10) Patent No.: US 9,418,068 B2
(45) Date of Patent: Aug. 16, 2016

(54) DIMENSIONAL CONVERSION IN PRESENTATIONS

(75) Inventors: Christopher Michael Maloney, San Francisco, CA (US); Muhammad Asim Goheer, Morgan Hill, CA (US); Jesse Patrick Harvey, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1117 days.

(21) Appl. No.: 13/360,142

(22) Filed: Jan. 27, 2012

(65) Prior Publication Data
US 2013/0198617 A1    Aug. 1, 2013

(51) Int. Cl.
| | |
|---|---|
| *G06F 17/00* | (2006.01) |
| *G06F 17/30* | (2006.01) |
| *G06F 17/21* | (2006.01) |
| *G06F 9/44* | (2006.01) |
| *G06F 3/0488* | (2013.01) |

(52) U.S. Cl.
CPC ........ *G06F 17/30056* (2013.01); *G06F 9/4443* (2013.01); *G06F 17/211* (2013.01); *G06F 3/04886* (2013.01)

(58) Field of Classification Search
CPC .......................... G06F 17/211; G06F 17/30056
See application file for complete search history.

(56) References Cited

U.S. PATENT DOCUMENTS

| | | | | |
|---|---|---|---|---|
| 5,717,939 A * | 2/1998 | Bricklin | ................ | G06F 17/211 345/173 |
| 5,796,401 A * | 8/1998 | Winer | ..................... | G06T 11/60 345/619 |
| 6,456,305 B1 * | 9/2002 | Qureshi | ............ | G06F 17/30905 707/E17.121 |
| 7,193,609 B2 * | 3/2007 | Lira | ...................... | G06F 3/0485 345/157 |
| 7,634,725 B2 * | 12/2009 | Nishikawa | ............. | G06K 15/02 715/243 |
| 7,711,208 B2 * | 5/2010 | Grunder | .................. | G06T 11/60 345/660 |
| 8,176,414 B1 | 5/2012 | Baluja | | |
| 8,612,849 B2 * | 12/2013 | Boreham | .............. | G06F 17/211 715/243 |
| 8,782,513 B2 * | 7/2014 | Migos | .................. | G06F 1/1626 715/230 |
| 8,988,456 B2 * | 3/2015 | Hanson | ......................... | 345/619 |
| 2003/0095135 A1 * | 5/2003 | Kaasila | ................. | G06F 3/0481 345/613 |
| 2004/0051893 A1 * | 3/2004 | Yoshida | ................. | G06K 15/02 358/1.11 |
| 2004/0205624 A1 | 10/2004 | Lui et al. | | |
| 2005/0034077 A1 * | 2/2005 | Jaeger | .................... | G06F 3/0481 715/732 |
| 2005/0094206 A1 * | 5/2005 | Tonisson | ................ | G06F 17/248 358/1.18 |
| 2006/0107204 A1 * | 5/2006 | Epstein | ................. | G06F 17/212 715/243 |
| 2006/0117255 A1 * | 6/2006 | Seeler | ................... | G06F 17/212 715/246 |

(Continued)

OTHER PUBLICATIONS

MOS 2010 Study Guide for Microsoft® PowerPoint; By: Joan Lambert; Joyce Cox; Publisher: Microsoft Press; Pub. Date: Sep. 22, 2011; Pages in Print Edition: 158; (Excerpt Provided for Apply Slide Size and Orientation Settings).*

(Continued)

*Primary Examiner* — Scott Baderman
*Assistant Examiner* — Benjamin J Smith
(74) *Attorney, Agent, or Firm* — Julie Kane Akhter; Tom Wong; Micky Minhas

(57) ABSTRACT

Technologies are described herein for converting presentations between differing slide dimensions and aspect ratios. A scaling factor is calculated from the difference between the original dimensions of the slide and the new dimensions of the converted slide. Next, the content objects on the slide are scaled based on the scaling factor such that the aspect ratio of the content object is maintained. Finally, the content objects are repositioned on the slide in order to maintain a relative distance between the position of the content object and the center of the slide.

20 Claims, 9 Drawing Sheets

(56) References Cited

U.S. PATENT DOCUMENTS

| | | | |
|---|---|---|---|
| 2006/0242565 A1* | 10/2006 | Makela | G06F 17/30905 715/210 |
| 2007/0157105 A1* | 7/2007 | Owens | H04L 67/36 715/771 |
| 2008/0095470 A1* | 4/2008 | Chao | G06T 3/0012 382/298 |
| 2008/0174570 A1* | 7/2008 | Jobs | G06F 3/0488 345/173 |
| 2008/0252856 A1* | 10/2008 | Hsiao | G03B 21/00 353/40 |
| 2009/0044123 A1 | 2/2009 | Tilton et al. | |
| 2009/0119597 A1 | 5/2009 | Vaughan et al. | |
| 2009/0144652 A1* | 6/2009 | Wiley | G06F 9/4443 715/800 |
| 2010/0064223 A1 | 3/2010 | Tilton | |
| 2010/0218089 A1* | 8/2010 | Chao | G09G 5/14 715/246 |
| 2010/0218100 A1* | 8/2010 | Simon | G06F 17/30056 715/731 |
| 2010/0325103 A1* | 12/2010 | Miller | G06F 17/30572 707/722 |
| 2011/0025715 A1* | 2/2011 | Uchida | H04N 1/00408 345/660 |
| 2011/0085078 A1 | 4/2011 | Sie et al. | |
| 2011/0181520 A1* | 7/2011 | Boda | G06F 1/1645 345/173 |
| 2012/0001914 A1* | 1/2012 | Pan | G06Q 30/0241 345/428 |
| 2012/0002226 A1* | 1/2012 | Zhan | G06F 3/1205 358/1.11 |
| 2012/0246678 A1* | 9/2012 | Barksdale | G06F 3/011 725/37 |
| 2013/0007603 A1* | 1/2013 | Dougherty | G06T 11/60 715/251 |
| 2013/0125050 A1* | 5/2013 | Goshey | G06F 3/048 715/800 |
| 2013/0127916 A1* | 5/2013 | Van Slembrouk | G06F 17/30905 345/660 |
| 2013/0127919 A1* | 5/2013 | Van Slembrouck | G06F 17/211 345/661 |
| 2013/0263280 A1* | 10/2013 | Cote | G06F 21/62 726/26 |
| 2014/0250371 A1* | 9/2014 | Wabyick | G06F 17/21 715/243 |

OTHER PUBLICATIONS

How to: Convert a PowerPoint Presentation from 4:3 ratio to 16:9 without distorted or stretched images; Scott Hanselman; Nov. 15, 2011; 8 pages; http://www.hanselman.com/blog/HowToConvertAPowerPointPresentationFrom43RatioTo169WithoutDistortedOrStretchedImages.aspx.*

PowerPoint 2010; Microsoft Office Professional Plus 2010; Copyright 2010 by Microsoft; 4 pages.*

Wang, et al., "Optimized Scale-and-Stretch for Image Resizing", Dec. 2008, ACM Transactions on Graphics, vol. 27(5), Proceedings of ACM SIGGRAPH Asia 2008, pp. 8.

"Drawing an Image", Retrieved at <<http://docs.oracle.com/javase/tutorial/2d/images/drawimage.html>>, Retrieved Date: Nov. 18, 2011, pp. 4.

Office action for U.S. Appl. No. 13/539,613, mailed on Apr. 20, 2015, Maloney et al., "Dimensional Conversion in Presentations", 16 pages.

Office action for U.S. Appl. No. 13/539,600, mailed on Apr. 23, 2015, Inventor #1, "Dimensional Conversion in Presentations", 14 pages.

Office action for U.S. Appl. No. 13/539,613 mailed on Nov. 5, 2015, Maloney et al., "Dimensional Conversion in Presentations", 19 pages.

Office action for U.S. Appl. No. 13/539,600 mailed on Nov. 10, 2015, Maloney et al., "Dimensional Conversion in Presentations", 16 pages.

Office action for U.S. Appl. No. 13/539,600, mailed on Apr. 7, 2016, Maloney et al., "Dimensional Conversion in Presentations", 16 pages.

* cited by examiner

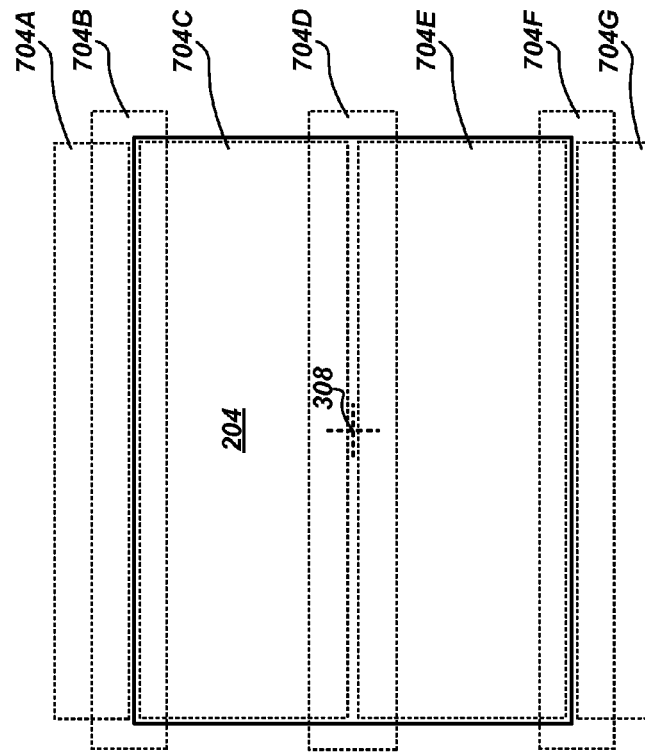
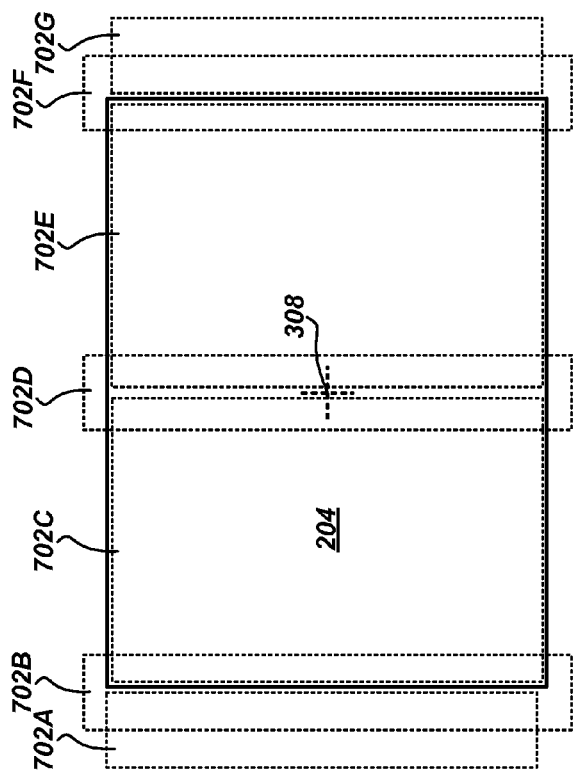

DIMENSIONAL CONVERSION IN PRESENTATIONS

BACKGROUND

Many presentation applications allow the development of presentations comprising a number of "slides" containing text, drawing objects, images, videos, animations, and other content. The slides of a presentation usually all share consistent dimensions. While the dimensions of slides may vary, traditionally the dimensions of slides in a presentation have been set to create a rectangular slide that translates to an aspect ratio (width:height) of 4:3. This is a standard ratio utilized for years in television, cinematography, photography (e.g. 35 mm slides), and the like. However, many modern computer monitors, televisions, projectors, tablet computers, mobile phones, and the like employ a "widescreen" format with varied aspect ratios from 2.39:1 to 16:10. The Society of Motion Picture and Television Engineers ("SMPTE") adopted a 16:9 aspect ratio format in the 1980s for High Definition Television ("HDTV"), and this standard 16:9 aspect ratio is widely accepted as a standard for television screens, projectors, monitors, and other display devices.

Because of the persistence of the 4:3 aspect ratio in presentation applications for many years, many presentations, templates, sample presentations, and the like have slides with dimensions that correspond to this ratio, such as 10" wide by 7½" high. When these slides are converted to widescreen format for display on a monitor, television, projector, or other device, various known methods may be utilized to scale the slides to fit the screen. For example, each slide may be stretched to fill the display area, causing drawing objects, images, videos, and other graphical content to appear distorted. Letterboxing may also be utilized, where the slides are scaled down evenly to fit in both dimensions, and black bars (or some other graphical elements) are placed around the edges where content does not appear due to the disparity in aspect ratios between the slides and the display device. Similarly, cropping may be utilized to cut out portions of the original slides from the display so that the remaining content fills the entire screen.

It will be appreciated that these methods may not result in an acceptable display of the slides in the presentation. Instead, the presentation designer may wish to convert the slides of the presentation to have dimensions that conform to the new target aspect ratio. This may be done manually by the presentation designer by reformatting and repositioning the text, drawing objects, images, videos, animations, and other content objects on every slide for an acceptable display. However, manual conversion of the slides may be tedious and time consuming. Alternatively, the slides of the presentation may be converted to the new dimensions automatically by the presentation application. Generally, however, the automatic conversion by the presentation application simply results in each content object on the slides being stretched to conform to the new aspect ratio, which may result in unwanted distortion of the content.

It is with respect to these considerations and others that the disclosure made herein is presented.

SUMMARY

Technologies are described herein for converting presentations between differing slide dimensions and aspect ratios. Utilizing the technologies described herein, the content objects of slides in a presentation may be scaled and/or repositioned in conjunction with a conversion of the slides to new dimensions in order to format the presentation for display at a different aspect ratio. For example, the methods and concepts described herein may be utilized to convert the slides of a presentation with dimensions conforming to a 4:3 aspect ratio, such as 10" wide by 7.5" high, to have new dimensions conforming to a 16:9 aspect ratio, such as 13.333" wide by 7.5" high, without disarranging the relative position of or distorting the content objects contained in the slides. This may allow the converted slides of the presentation to take full advantage of the display area of the target display device while retaining as much semantic meaning as possible from the position and size of the content objects on the original slides.

According to embodiments, a scaling factor is calculated from the differences between the original dimensions of the slide and the new dimensions of the converted slide. Next, the content objects on the slide are scaled based on the scaling factor such that the aspect ratio of the content object is maintained. Finally, the content objects are repositioned on the slide in order to maintain a relative distance between the position of the content object and the center of the slide.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A and 7B are block diagrams illustrating horizontally-oriented and vertically-oriented zones of a slide affecting the dimensional conversion of the associated content objects occurring in the zones, according to embodiments described herein;

DETAILED DESCRIPTION

The following detailed description is directed to technologies for converting presentations between differing slide dimensions and aspect ratios. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
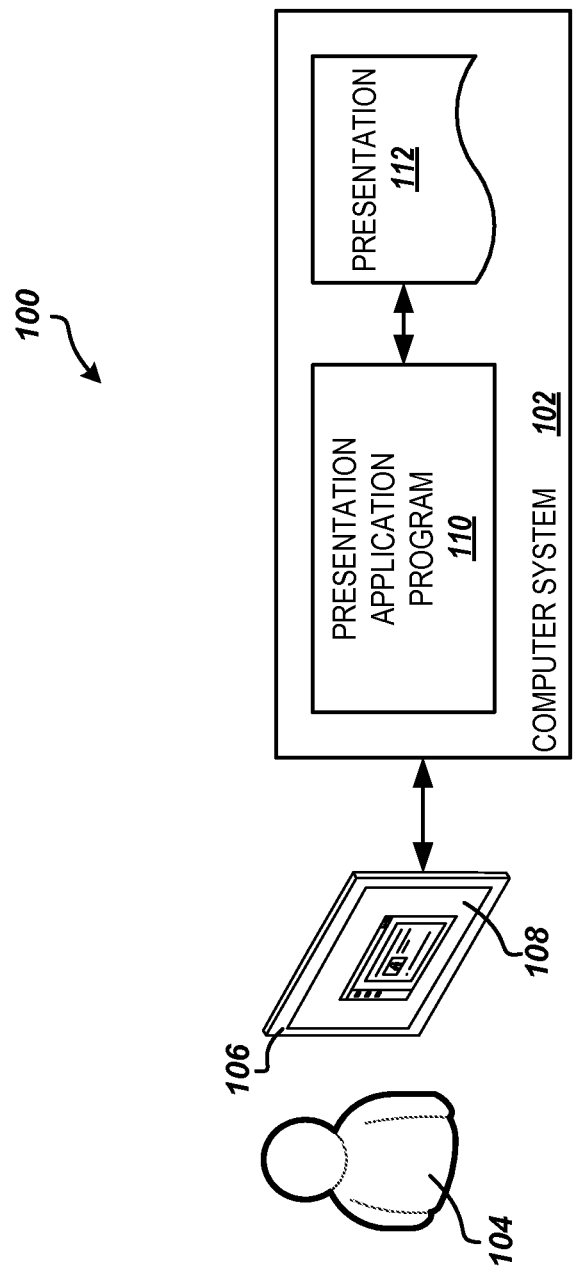
FIG. 1 is a block diagram showing aspects of an illustrative operating environment and software components provided by the embodiments presented herein.

FIG. 1 shows an illustrative operating environment 100 including software components for converting presentations between differing slide dimensions and aspect ratios, according to embodiments provided herein. The environment 100 includes a computer system 102. The computer system 102 may represent a user computing device, such as a tablet device, a personal computer ("PC"), a desktop workstation, a laptop, a notebook, a mobile device, a personal digital assistant ("PDA"), and the like. Alternatively, the computer system 102 may represent a user computing device operatively connected to one or more application servers, Web servers, database servers, network appliances, dedicated hardware devices, and/or other server computers or user computing devices known in the art. The computer system 102 is accessed by a user 104, through a display device 106 and one or more input devices, such as a touchscreen 108 found on a tablet device, as shown in FIG. 1. It will be appreciated that the input devices may also include a keyboard and/or a mouse.

According to embodiments, a presentation application program 110 executes on the computer system 102 that allows the user 104, such as a presentation designer, to create and modify a presentation 112 through the addition, manipulation, and/or removal of text, shapes and other drawing objects, photographs or other graphic images, videos, animations, and the like (referred to herein generically as "content objects") in one or more content containers, or "slides." For example, the presentation application program 110 may be the MICROSOFT® POWERPOINT® presentation application from Microsoft Corp. of Redmond, Wash. The presentation application program 110 may execute locally on the user computing device of the computer system 102, or may execute on a server computer, such as a Web server, accessed by a client application executing on the user computing device. The presentation application program 110 may be implemented as hardware, software, or a combination of the two. In addition, the presentation application program 110 may comprise any number of application program modules and other components executing on the computer system 102 or other computing platforms. The presentation 112 may be stored in a volatile memory of the computer system 102 as well as on a non-volatile storage system, such as a disk drive, operatively connected to the computer system.

Figure 2:
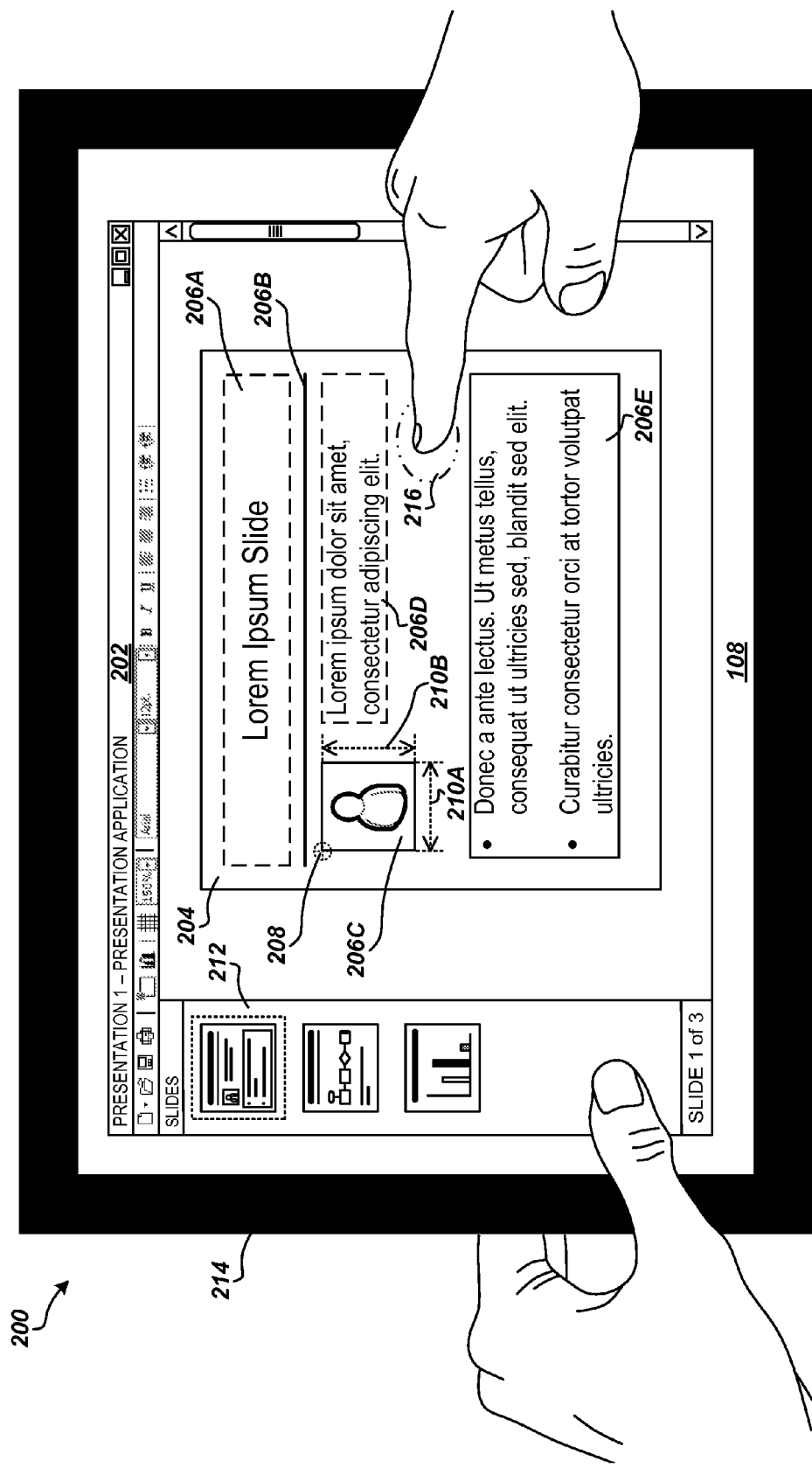
FIG. 2 is a screen diagram showing an illustrative user interface for presenting the content objects and slides in a presentation, according to embodiments described herein.

FIG. 2 shows an example of an illustrative user interface 200 displayed by the presentation application program 110. According to some embodiments, the user interface 200 may be displayed on a tablet device 214, as further shown in FIG. 2. A user may interact with the user interface 200 by touching elements in the user interface on the touchscreen 108 of the tablet device 214, as shown at 216, to perform the user operations described herein. The user interface 200 includes a window 202 in which a number of content objects 206A-206E (referred to herein generally as content object 206 or content objects 206) are shown on a slide 204. Common content objects 206 placed on the slide 204 may include text placeholders, such as text placeholders shown at 206A and 206D shown in FIG. 2; drawing shapes and objects, such as the line shown at 206B, graphic objects, such as the picture shown at 206C, and textboxes, such as the textbox shown at 206E. It will be appreciated that content objects 206 may further include photographs, videos, tables, charts, embedded documents, and other types of content known in the art for inclusion in a presentation. The content objects 206 may be placed and arranged on the slide 204 by the user 104 using the touchscreen 108 as described above. The user interface 200 may also include a slide list 212 that allows the user 104 to select from among multiple slides 204 in the presentation 112 for viewing or modification in the window 202.

According to embodiments, each content object 206 is bounded by an invisible bounding rectangle (not shown). The bounding rectangle for a content object 206 may be defined as the smallest rectangle that can fully enclose the object. It will be appreciated that for rectangular content objects, such as content objects 206C and 206E shown in FIG. 2, the bounding rectangles will be the same as the object borders, while for non-rectangular content objects, such as content objects 206A, 206B, and 206D, the bounding rectangle may be inferred by the presentation application program 110 from the content object and may or may not be shown on the slide 204. Each content object 206 further has a position 208 representing the position of the object on the slide 204. The position 208 may comprise horizontal and vertical coordinates of an upper-left corner of the bounding rectangle, for example. Each content object 206 further has dimensions 210A, 210B (referred to herein generally as dimensions 210) representing the size of the object on the slide 204. The dimensions may comprise a horizontal dimension 210A and a vertical dimension 210B of the bounding rectangle, for example.

Figure 3:
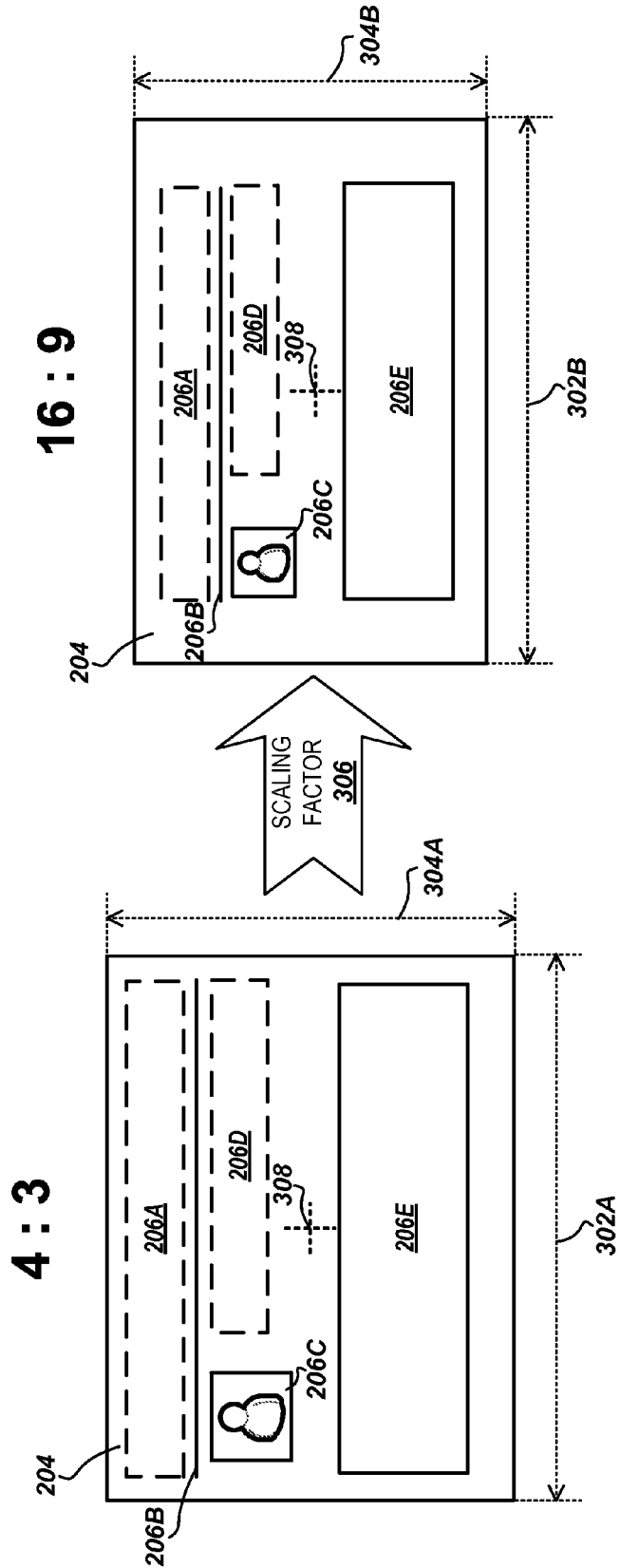
FIG. 3 is a block diagram showing aspects of the dimensional conversion of a slide and the associated content object, according to embodiments described herein.

FIG. 3 shows aspects of the dimensional conversion of a slide 204 by the presentation application program 110 as described by the embodiments herein. According to embodiments, each slide 204 in the presentation 112 has a horizontal dimension 302A (referred to herein generally as horizontal dimension 302) and a vertical dimension 304A (referred to herein generally as vertical dimension 304) that represents the overall size (i.e. width and height) of the slide. In some cases, all of the slides 204 in the presentation 112 may have the same overall dimensions 302, 304. In other cases, the dimensions 302, 304 may vary from slide to slide. Moreover, the overall dimensions 302A, 304A of the slides 204 may correspond to a particular aspect ratio. For example, a presentation 112 created by the presentation application program 110 may have one or more slides with a horizontal dimension 302A of 10" and a vertical dimensions 304A of 7.5" corresponding to a 4:3 aspect ratio.

In order to format the presentation 112 for display on a display device 106 with a different aspect ratio, such as 16:9, the user 104 may instruct the presentation application program 110 to dimensionally convert the slides 204 of the presentation to new overall dimensions 302B and 304B. For example, the user 104 may instruct the presentation application program 110 to convert each slide 204 to have a horizontal dimension 302B of 10" and a vertical dimensions 304B of 5.63" to produce slides in a 16:9 aspect ratio that will still print on a single sheet of standard Letter size paper (8.5"×11") with acceptable margins. Alternatively, the user 104 may instruct the presentation application program 110 to maintain the vertical dimension 304B at 7.5" and simply increase the horizontal dimension 302B of the converted slides 204 to 13.33". It will be appreciated that any new overall dimensions 302B, 304B may be selected by the user that produces the desired aspect ratio.

In addition to changing the overall dimensions 302, 304 of the slides 204 in the presentation 112, the dimensional conversion process performed by the presentation application program 110 further comprises scaling and/or repositioning the content objects 206 on the slides. For example, a scaling factor 306 may be calculated based on the differences in the old dimensions 302A, 304A and new dimensions of the slides 204. The scaling factor 306 may then be utilized to scale the content objects 206 on each slide 204, as will be further described below in regard to FIGS. 4-7B. In some embodiments, the scaling factor 306 may further be used to reposition each content object 206 based on its relative position 208 on the slide with respect to a center 308 of the slide. According to embodiments, the scaling and/or repositioning of the content objects 206 on the slides 204 is done in such a way as to allow the converted slides of the presentation 112 to take full advantage of the display area of the target display device 106 while retaining as much semantic meaning as possible from the position and size of the content objects on the original slides, as will be described in more detail below.

Figure 4:
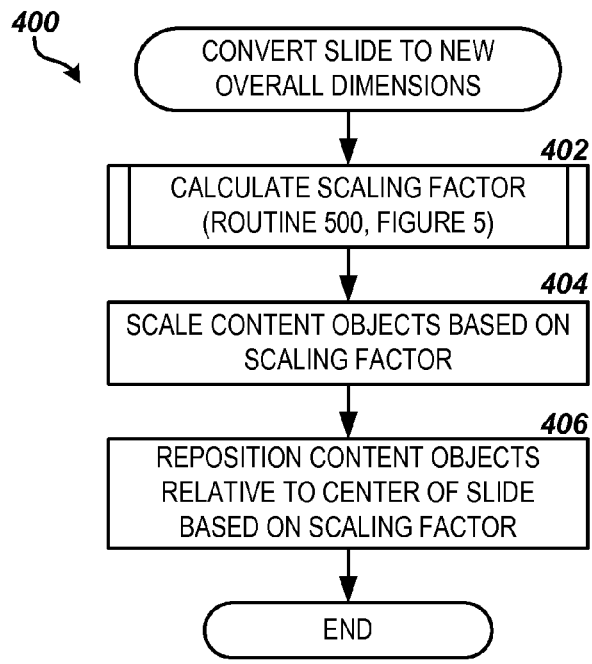
FIG. 4 is a flow diagram showing one method for converting presentations between differing slide dimensions and aspect ratios utilizing a spatial relationship retention approach, according to embodiments described herein.
Figure 5:
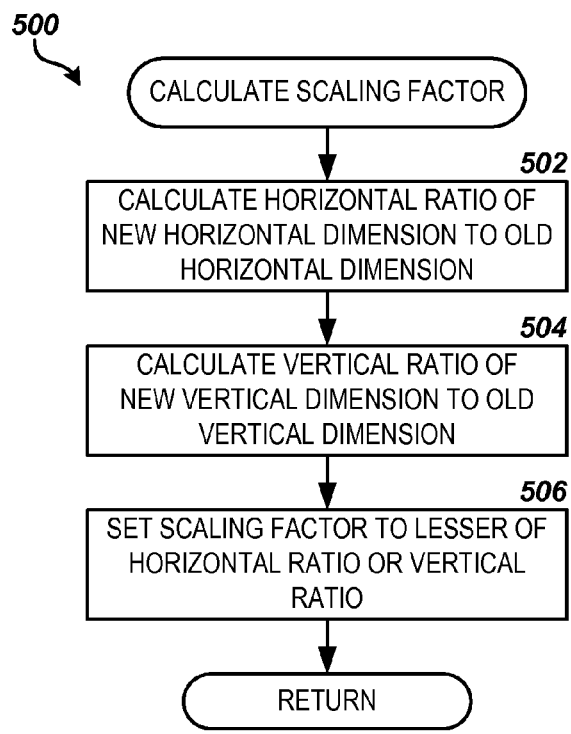
FIG. 5 is a flow diagram showing one method for determining a scaling factor to be used in the dimensional conversion of slides and content objects in a presentation, according to embodiments described herein.
Figure 6:
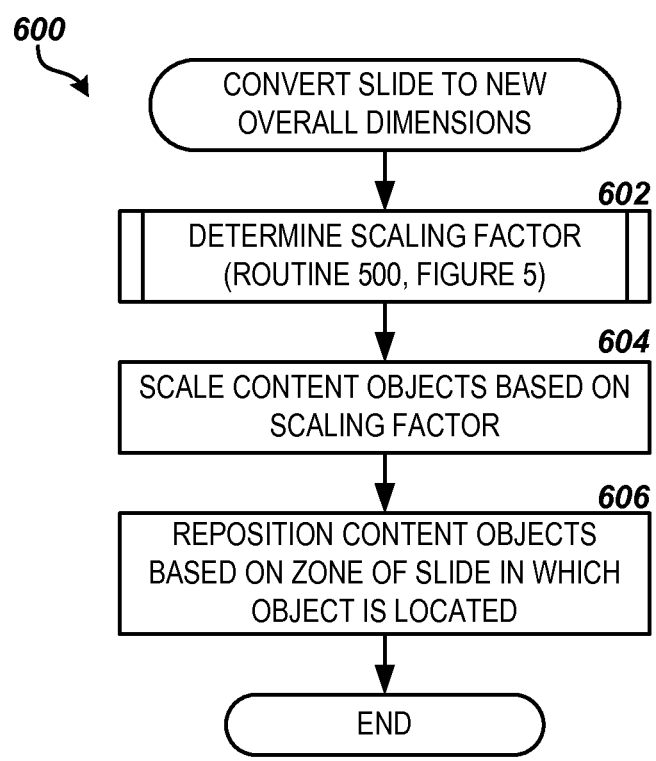
FIG. 6 is a flow diagram showing another method for converting presentations between differing slide dimensions and aspect ratios using an even distribution approach, according to embodiments described herein.

Referring now to FIG. 4, additional details will be provided regarding the embodiments presented herein for converting presentations between differing slide dimensions and aspect ratios. It should be appreciated that the logical operations described with respect to FIGS. 4, 5, and 6 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and/or modules may be implemented in software, in firmware, in special purpose digital logic, and any combination thereof. It should also be appreciated that more or fewer operations may be performed than shown in the figures and described herein. The operations may also be performed in a different order than described.

FIG. 4 illustrates one routine 400 for performing the dimensional conversion of a slide 204 in a presentation 112, as describe above in regard to FIG. 3. According to embodiments, the routine 400 seeks to retain the spatial relationship of the content objects 206 on the slide 204 when repositioning the objects. The routine 400 may be performed by the presentation application program 110 when instructed by the user 104 to change the overall dimensions 302, 304 of a slide 204, for example. It will be appreciated that the routine 400 may also be performed by other modules or components executing on the computer system 102, or by any combination of modules, components, and computing devices.

The routine 400 begins at operation 402, where the presentation application program 110 calculates a scaling factor 306 to be used in the dimensional conversion. According to some embodiments, the scaling factor 306 is calculated by dividing one of the new overall dimensions 302B, 304B of the slide 204 by the corresponding old dimension 302A, 304A. To accommodate the potential disparity between the difference in horizontal dimensions 302A, 302B and the difference in vertical dimensions 304A, 304B in the slide conversion, different dimensions may be utilized to calculate the scaling factor according to different cases. For example, if both overall dimensions 302, 304 of the slide 204 are increased, or one dimension is increased and the other remains constant, the presentation application program 110 may calculate the scaling factor 306 from the ratio of the new dimension to old dimension for the dimension with the smallest increase. Therefore, if converting the slide 204 from 10"×7.5" to 14"× 8.5", the scaling factor 306 will have a value of 1.13 (8.5/7.5), since the difference between 8.5" and 7.5" is smaller than the difference between 14" and 10". It will be appreciated that if one dimension remains constant, the scaling factor 306 will have a value of 1.0, resulting in no scaling of the content objects 206 on the slide.

Conversely, if both overall dimensions 302, 304 are decreased, or one dimension is decreased and the other remains constant, the presentation application program 110 may calculate the scaling factor 306 from the ratio of new dimension to old dimension for the dimension with the largest decrease. Therefore, if converting the slide 204 from 10"× 7.5" to 5"×6.5", the scaling factor 306 will have a value of 0.5 (5/10), since the difference between 10" and 5" is larger than the difference between 7.5" and 6.5". If one overall dimension 302, 304 is increased and the other is decreased, the presentation application program 110 may calculate the scaling factor 306 from the ratio of new dimension to old dimension for the decreasing dimension. This may be the case when the orientation of the slides 204 in the presentation 112 is being converted to portrait mode from landscape mode or vice versa, for example.

In some embodiments, the presentation application program 110 utilizes the routine 500 shown in FIG. 5 to calculate the scaling factor 306 from the new overall dimensions 302B, 304B and old overall dimensions 302A, 304A of the slide 204. The routine 500 begins at operation 502, where the presentation application program 110 calculates a horizontal ratio of the new horizontal dimension 302B to the old horizontal dimension 302A of the slide 204. Next, the routine 500 proceeds from operation 502 to operation 504, where the presentation application program 110 calculates a vertical ratio of the new vertical dimension 304B to the old vertical dimension 304A. Finally, the routine 500 proceeds to operation 506, where the presentation application program 110 selects the lesser of the horizontal ratio or vertical ratio as the scaling factor 306. From operation 506, the routine 500 returns to the routine 400.

It will be appreciated that the routine 500 depicted in FIG. 5 described above satisfies the various cases described above in regard to operation 402. Table 1 below provides a pseudo-code definition of a function for calculating the scaling factor 306 using the routine 500 described herein:

TABLE 1

Pseudo Code for Calculating One Possible Scaling Factor

```
DetermineScaleFactor(Ow, Oh, Nw, Nh)
  Ow = old width of slide
  Oh = old height of slide
  Nw = new width of slide
  Nh = new height of slide
  returns: a floating point value representing scale factor
  SFw = Nw/Ow
  SFh = Nh/Oh
  Return MIN(SFw, SFh)
```

In further embodiments, the presentation application program 110 may prompt the user 104 to select whether to utilize the difference in horizontal dimensions 302A, 302B or the difference in vertical dimensions 304A, 304B in calculating the scaling factor 306. Returning to FIG. 4, from operation 402, the routine 400 proceeds to operation 404, where the presentation application program 110 uses the calculated scaling factor 306 to scale the content objects 206 on the slide 204. Because there may be less space available on the slide 204 at the new dimensions 302B, 304B than at the old dimensions 302A, 304A, the content objects 206 on the slide may need to be scaled to accommodate fitting every object on the slide. In some cases, the content objects 206 may be scaled by simply applying the scaling factor 306 to the dimensions 210 of the bounding rectangle of the object. According to some embodiments, the aspect ratio of each individual content object 206 on the slide 204 is maintained by applying the same scaling factor 306 to both the horizontal dimension 210A and vertical dimension 210B of the content object. This may be done to avoid unwanted distortion of the content object 206 on the converted slide 204. Other content objects 206, such as motion paths or connectors between two other objects, may only be scaled in the dimension that corresponds to the overall dimension 302, 304 of the slide from which the scaling factor 306 was calculated.

The content of some content objects 206 may be automatically resized when the new dimensions 210 of the object are applied. For example, the text content of a text placeholder may be automatically resized when the new dimensions 210 of the text placeholder are applied if an "autofit" property of the text placeholder is set. Other content objects 206, may require that the contents of the content object be scaled in addition to the resizing of the bounding rectangle. For example, for a textbox or shape containing text, the scaling factor 306 may also be applied to the point-size of the font of the text, the margins in the textbox or shape, the paragraph spacing of the text, and other properties of the text in addition to resizing the textbox or shape using the scaling factor.

In further embodiments, the scaling factor 306 may also be applied to certain properties of the content objects 206, such as border width and the like, in conjunction with the resizing of the object. This may present problems, however, when the content objects 206 and associated properties were derived from a theme or default shape or object style. Table 2 below provides a pseudo-code definition of a function for scaling the content objects 206 on a slide using the scaling factor 306, according to operation 404 described herein:

TABLE 2

Pseudo Code for Scaling Content Objects of a Slide

```
UpdateScale (Slide sl, Ow, Oh, Nw, Nh)
  sl = current slide
  Ow = old width of slide
  Oh = old height of slide
  Nw = new width of slide
  Nh = new height of slide
  scaleFactor = DetermineScaleFactor(Ow, Oh, Nw, Nh)
  //Iterate through shapes
  For each shape s in sl.shapes
    If(s.hasText)
      For each run r in s.textRuns
        r.ptsize = r.ptsize * scaleFactor
    s.width = s.width * scaleFactor
    s.height = s.height * scaleFactor
```

The routine 400 proceeds from operation 404 to operation 406, where the presentation application program 110 uses the calculated scaling factor 306 to reposition the content objects 206 on the slide 204, while retaining the spatial relationship between the objects that existed in the original layout of the slide. According to some embodiments, each content object 206 is repositioned by applying the scaling factor 306 to both the horizontal and vertical distances of the position 208 of the content object from the center 308 of the slide 204. In this way, the relative distances between content objects 206 on the slide 204 remain substantially the same after scaling and repositioning. By using the center 308 of the slide 204 as an anchor point, spatial relationships are maintained, and it may appear to the user 104 as if all the content objects 206 were scaled and repositioned as a single object. Table 3 below provides a pseudo-code definition of a function for repositioning the content objects 206 on the slide using the spatial relationship retention method, according to operation 406 described herein:

TABLE 3

Pseudo Code for Spatial Relationship Retention Repositioning

```
UpdatePositions (Slide sl, Fw, Fh, Gw, Gh)
  sl = slide to convert
  Fw = old width of slide
  Fh = old height of slide
  Gw = new width of slide
  Gh = new height of slide
  scaleFactor = DetermineScaleFactor(Fw, Fh, Gw, Gh)
  float oldCenterX = Fw / 2.0
  float oldCenterY = Fh / 2.0
  float newCenterX = Gw / 2.0
  float newCenterY = Gh / 2.0
  //Iterate through shapes
  For each Shape s in sl.shapes
    float Oxdist = oldCenterX – s.x
    float Oydist = oldCenterY – s.y
    s.x = newCenterX – (Oxdist*scaleFactor)
    s.y = newCenterY – (Oydist*scaleFactor)
```

According to some embodiments, content objects 206 that are "off-slide," i.e. not within the visible confines of the slide 204, are handled differently by the presentation application program 110 during the repositioning so that their function or meaning is not lost during the dimensional scaling procedure. The off-slide content objects 206 will remain off-slide, with their positions modified according to the scaling factor 306 in reference to their distances from the appropriate edge of the slide 204. Similarly, content objects 206 may be strategically placed partially off an edge of the slide 204 in order to display a very specific portion of the content of the object. Content objects 206 that are partially off an edge of the slide 204 will be repositioned by the presentation application program 110 so that the same portion of the content object visible on the slide 204 at its original dimensions 302A, 304A will remain visible on the converted slide. From operation 406, the routine 400 ends.

FIG. 6 illustrates another routine 600 for performing the dimensional conversion of a slide 204 in a presentation 112, according to further embodiments. In contrast to the routine 400 described above in regard to FIG. 4, the routine 600 seeks to evenly distribute the content objects across the converted slide 204 through the repositioning of the objects. The routine 600 may be performed by the presentation application program 110 when instructed by the user 104 to change the overall dimensions 302, 304 of a slide 204, for example. It will be appreciated that the routine 600 may also be performed by other modules or components executing on the computer system 102, or by any combination of modules, components, and computing devices.

The routine 600 begins at operation 602, where the presentation application program 110 calculates a scaling factor 306 to be used in the dimensional conversion. According to some embodiments, the scaling factor 306 is calculated using the same routine 500 as described above in regard to FIG. 5. From operation 602, the routine 600 proceeds to operation 604, where the presentation application program 110 uses the calculated scaling factor 306 to scale the content objects 206 on the slide 204. The scaling of the content objects may be performed as described in regard to operation 404 above.

The routine 600 proceeds from operation 604 to operation 606, where the presentation application program 110 repositions the content objects 206 on the slide 204 based on a zone of the slide in which the content object is located. In contrast to the spatial relationship retention method described above in regard to operation 406, here the presentation application program 110 does not reposition the content objects 206 based the distance between the object and the center 308 of the slide 204 relative to the scale factor 306, but rather the objects are repositioned relative to the change in one of the dimensions 210 of the object based on the object's location on the slide. This may allow for the content objects 206 to be scaled evenly in both dimensions 210 and spread evenly across the slide 204 in both the horizontal and vertical dimensions 302, 304 to maximize the space of the converted slide.

In addition, the presentation application program 110 attempts to retain as much semantic meaning as possible from the original positions 208 of the content objects 206 with respect to the edges and centerlines of the slide 204. To achieve this result, the presentation application program 110 divides the slide 204 horizontally into a number of horizontal position zones 702A-702G (referred to herein generally as horizontal position zone 702), as shown in FIG. 7A. The horizontal coordinate of the new position 208 of each content object 206 on the converted slide 204 is calculated based on the old position of the object on the slide, the change in the horizontal dimension 210A of the object that resulted from scaling, and the horizontal position zone 702 in which the object is located on the slide.

Similarly, the presentation application program 110 further divides the slide 204 vertically into a number of vertical position zones 704A-704G (referred to herein generally as vertical position zone 704), as shown in FIG. 7B. The vertical coordinate of the new position 208 of each content object 206 on the converted slide 204 is calculated based on the old position of the object on the slide, the change in the vertical dimension 210B of the object that resulted from scaling, and the vertical position zone 704 in which the object is located on the slide. According to some embodiments, the horizontal position zone 702 and vertical position zone 704 in which a content object is located is determined from a center point of the object, instead of the position 208 of the object, e.g. the upper left-hand corner of the bounding rectangle.

According to one embodiment, the slide 204 is divided into seven horizontal position zones 702A-702G and/or seven vertical position zones 704A-704G, as shown in FIGS. 7A and 7B. The horizontal coordinate and vertical coordinate for the new position 208 of each content object 206 will be calculated using a specific formula based on the horizontal position zone 702 and vertical position zone 704, respectively, of the slide 204 in which the center point of the content object 206 is originally located. It will be appreciated that while the horizontal position zones 702 vertical position zones 704 shown in FIGS. 7A and 7B are shown to overlap, a content object 206 can be located within only one zone at a time as determined by both the location of the center point of the content object and the dimensions 210 the object. Table 4 provides a notation utilized in the formulas below for calculating the new position 208 of the content objects 206 on the slide during repositioning:

TABLE 4

Notation Used in Relocation Formulas $N_x$ - New horizontal coordinate of object
$N_y$ - New vertical coordinate of object
$O_x$ - Old horizontal coordinate of object
$O_y$ - Old vertical coordinate of object
$N_w$ - New horizontal dimension 210A of object
$N_h$ - New vertical dimension 210A of object
$O_w$ - Old horizontal dimension 210B of object
$O_h$ - Old vertical dimension 210B of object
$F_w$ - Old horizontal dimension 302A of slide
$F_h$ - Old vertical dimension 304A of slide
$G_w$ - New horizontal dimension 302B of slide
$G_h$ - New vertical dimension 304B of slide When the content object 206 is located completely off the left edge of the slide 204, i.e. located in horizontal position zone 702A, the presentation application program 110 may calculate the new horizontal coordinate ($N_x$) of the object so that the same relative distance from the edge of the slide is maintained. The equation below also takes into account the change in the horizontal dimension 210A of the object that resulted from scaling:

$$N_x = 0.0 - N_w - \left((0.0 - O_X - O_w) * \left(\frac{N_W}{O_W}\right)\right)$$

When the content object 206 is located partially off the left edge of the slide 204, i.e. located in horizontal position zone 702B, the presentation application program 110 may calculate the new horizontal coordinate ($N_x$) of the object so that the same amount of overlap with the slide is maintained. In this way, whatever part of the content object 206 was visible before the dimensional conversion process will be exactly the part that is visible after the conversion. In some embodiments, the coordinate system of the slide 204 may start at 0, 0 in the upper left-hand corner of the slide. Therefore, content objects 206 located off the left edge of the slide 204 can maintain the current negative horizontal coordinate of their position 208 and still overlap the slide the same amount before and after the dimensional conversion. However, since the horizontal dimension 210A of the content object 206 may have changed during the scaling operation, the object's position 208 may be shifted to accommodate the change. Therefore, the new horizontal coordinate ($N_x$) of the content object 206 can be expressed as:

$$N_x = \left(\frac{O_w + O_x}{O_w}\right) * N_w - N_W$$

For content objects 206 located between the left edge and the center 308 of the slide 204, i.e. located in horizontal position zone 702C, the presentation application program 110 may calculate the new horizontal coordinate ($N_x$) of the objects so that the objects are moved in proportion to the change in their horizontal dimension 210A. The formula for the new horizontal coordinate ($N_x$) allows for the even distribution of the content objects without dropping objects off the left edge of the slide 204. Because the content object 206 may have been scaled, the formula may also shift the position 208 to accommodate for this change:

$$N_x = \left(O_x - \frac{O_w}{2.0}\right) * \left(\frac{N_w}{O_w}\right) - \left(\frac{N_w}{2.0}\right)$$

When the content object 206 is located exactly in the center 308 of the slide 204, i.e. located in horizontal position zone 702D, the presentation application program 110 may calculate the new horizontal coordinate ($N_x$) of the object so that the object remains in the center of the converted slide. The formula for the new horizontal coordinate ($N_x$) of centered objects shifts the content object 206 to a position on the new slide wherein its center point will rest exactly on the centerline of the slide, taking into account the width of the object:

$$N_x = \frac{G_w - N_w}{2.0}$$

For content objects 206 located to the right of the center 308 of the slide 204 and completely within the right edge of the slide, i.e. located in horizontal position zone 702E, the presentation application program 110 may calculate the new horizontal coordinates ($N_x$) of the objects so that the objects are distributed evenly across the slide but the right edge of the objects will not fall off the right edge of the slide. The formula for the new horizontal coordinate ($N_x$) takes into account the horizontal dimension 210A of the content object 206 before shifting, thus preventing the object from falling off the edge of the slide when repositioned:

$$N_x = \left((O_x + O_w) + \frac{O_w}{2.0}\right) * \left(\frac{N_w}{O_w}\right) - \left(O_w + \frac{N_w}{2.0}\right)$$

When the content object 206 is located partially off the right edge of the slide 204, i.e. located in horizontal position zone 702F, the presentation application program 110 may calculate the new horizontal coordinate ($N_x$) of the object so that the same amount of overlap with the slide is maintained. Following the same rules for content objects 206 partially off the left edge, objects that fall partially off the right edge are moved to a location on the converted slide 204 such that the same part of the object that is off-slide will remain off-slide:

$$N_x = G_w - \left((F_w - O_x) * \left(\frac{N_w}{O_w}\right)\right)$$

For content objects 206 that are completely off the right edge of the slide, i.e. located in horizontal position zone 702G, the presentation application program 110 may calculate the new horizontal coordinate ($N_x$) of the object so that the relative distance between the right edge of the slide and the left edge of the object is maintained proportional to change in the horizontal dimension 210A of the object:

$$N_x = G_w + \left((O_x - F_w) * \left(\frac{N_w}{O_w}\right)\right)$$

Similarly, the presentation application program 110 may calculate the new vertical coordinate ($N_y$) of each content object 206 on the slide 204 using a similar formula based on the vertical position zone 704 of the slide 204 in which the center point of the object is originally located. According to some embodiments, content objects 206 that are grouped together in a group will be repositioned together, receiving a new horizontal and vertical coordinate for the group. The content objects 206 within the group will maintain their relative size and positioning with respect to one another. Table 5 below provides a pseudo-code definition of functions for repositioning the content objects 206 on the slide using the even distribution method, according to operation 606 described herein:

TABLE 5

Pseudo Code for Even Distribution Repositioning

```
DetermineRegionX(Shape s, Slide sl)
s = a shape for which the region is to be determined
sl = slide on which the shape is positioned
returns: a Region
if(s.x < (0 − s.width))
    return OffLeftEdge
else if(s.x < 0 && s.x > 0 − s.width)
    return PartiallyOffLeftEdge
else if(s.center.x < sl.center.x && s.x >= 0)
    return LeftHalf
else if(s.center.x == sl.center.x)
    return Centered
else if(s.center.x > sl.center.x && s.x < sl.width)
    return RightHalf
else if(s.x + s.width > sl.width && s.x <= sl.width)
    return PartiallyOffRightEdge
else if(s.x > sl.width)
    return CompletelyOffRightEdge
return InvalidPosition
DetermineRegionY(Shape s, Slide sl)
s = a shape for which the region is to be determined
sl = slide on which the shape is positioned
returns: a Region
if(s.y < (0 − s.height))
    return OffTopEdge
else if(s.y < 0 && s.y > 0 − s.height)
    return PartiallyOffTopEdge
else if(s.center.y < sl.center.y && s.y >= 0)
    return TopHalf
else if(s.center.y == sl.center.y)
    return Centered
else if(s.center.y > sl.center.y && s.y < sl.height)
    return BottomHalf
else if(s.y + s.height > sl.height && s.y <= sl.height)
    return PartiallyOffBottomEdge
else if(s.y > sl.height)
    return CompletelyOffBottomEdge
return InvalidPosition
```

TABLE 5-continued

Pseudo Code for Even Distribution Repositioning

```
UpdatePositions(Slide sl, Fw, Fh, Gw, Gh)
sl = slide to convert
Fw = old width of slide
Fh = old height of slide
Gw = new width of slide
Gh = new height of slide
//Iterate through shapes
For each Shape s in sl.shapes
    float Ox = s.oldx
    float Oy = s.oldy
    float Ow = s.oldwidth
    float Oh = s.oldheight
    float Nw = s.scaledwidth
    float Nh = s.scaledheight
    region Rx = DetermineRegionX(s, sl)
    region Ry = DetermineRegionY(s, sl)
    //Solve for Nx based on old horizontal location
    if(Rx == OffLeftEdge)
        s.x=0.0-Nw-((0.0-Ox-Ow)*(Nw/Ow))
    if(Rx == PartiallyOffLeftEdge)
        s.x=((Ow+Ox)/Ow)*Nw-Nw
    if(Rx == LeftHalf)
        s.x=(Ox+Ow/2.0)*(Nw/Ow)-(Nw/2.0)
    if(Rx == Centered)
        s.x=(Gw-Nw)/2.0
    if(Rx == RightHalf)
        s.x=((Ox+Sw)+Ow/2.0)*(Nw/Ow)-(Sw+Nw/2.0)
    if(Rx == PartiallyOffRightEdge)
        s.x= Gw-((Fw-Ox)*(Nw/Ow))
    if(Rx == CompletelyOffRightEdge)
        s.x=Gw+((Ox-Fw)*(Nw/Ow))
    //Solve for Ny based on old vertical location
    if(Ry == OffTopEdge)
        s.y=0.0-Nh-((0.0-Oy-Oh)*(Nh/Oh))
    if(Ry == PartiallyOffTopEdge)
        s.y=((Oh+Oy)/Oh)*Nh-Nh
    if(Ry == TopHalf)
        s.y=(Oy+Oh/2.0)*(Nh/Oh)-(Nh/2.0)
    if(Ry == Centered)
        s.y=(Gh-Nh)/2.0
    if(Ry == BottomHalf)
        s.y=((Oy+Sh)+Oh/2.0)*(Nh/Oh)-(Sh+Nh/2.0)
    if(Ry == PartiallyOffBottomEdge)
        s.y=Gh-((Fh-Oy)*(Nh/Oh))
    if(Ry == CompletelyOffBottomEdge)
        s.y=Gh+((Oy-Fh)*(Nh/Oh))
```

From operation 606, the routine 600 ends. According to further embodiments, special consideration of the algorithms utilized to scale and reposition the content objects 206 on the converted slide 204 may be necessary if an "undo" function of the presentation application program 110 is invoked by the user 104 of the computer system 102. For example, the presentation application program 110 may store the scale factor 306 that was used to perform the original dimensional conversion of the slide in order for the conversion to be reversed using the undo function.

In some embodiments, the presentation application program 110 may differentiate between those content objects 206 on a slide 204 that originate from a template or "slide master" associated with the slide, referred to herein as background objects, and those content objects that were placed on the slide by the user 104 through the user interface 200, referred to herein as foreground objects. For example, in the slide 204 shown in FIG. 2, the slide title text placeholder shown at 206A and the line drawing shape shown at 206B may be background objects that are taken from an associated theme or slide master, while content objects 206D-206E may be foreground objects added to the slide by the user 104.

Figure 8:
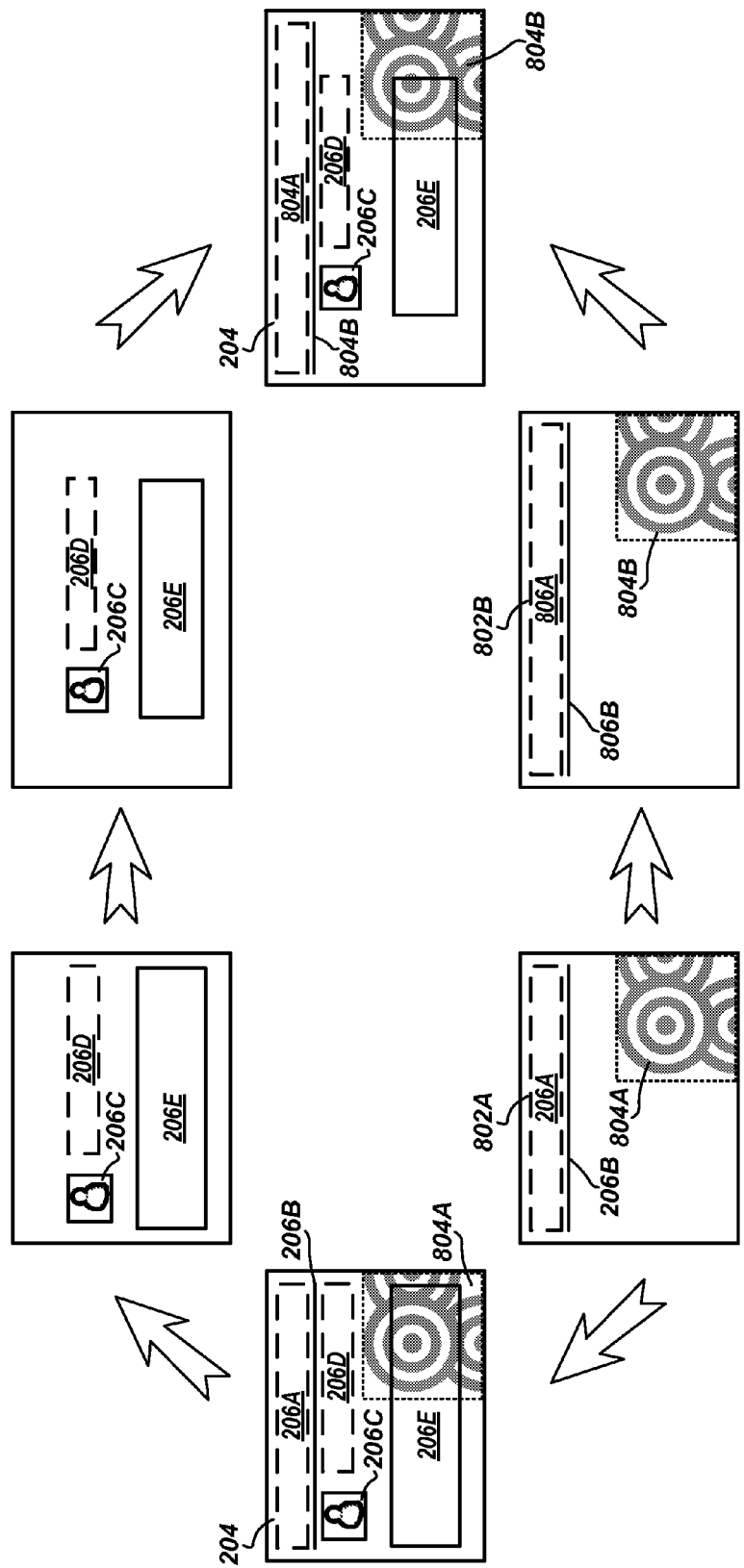
FIG. 8 is a block diagram showing further aspects of the dimensional conversion of a slide and the associated content objects, according to embodiments described herein.

FIG. 8 shows additional aspects of this dimensional conversion process performed by the presentation application program 110, according to embodiments. As shown in FIG. 8, a template or slide master associated with the slide 204, such as slide master 802A (referred to herein generally as slide master 802), may include background objects, such as content objects 206A and 206B, that are included in the slide. The slide master 802A may further include a background image 804A for inclusion on the slide 204. When the dimensional conversion process for the slide 204 is initiated, the presentation application program 110 may scale and reposition the foreground objects on the slide, such as content objects 206D-206E, using a method similar to the routines 400 or 600 described above in regard to FIGS. 4 and 6.

However, the background objects on the slide 204, such as content objects 206A-206B and background image 804A, may be removed by the presentation application program 110 and replaced with corresponding background objects 806A-806B and/or background image 804B from a template or master slide, such as slide master 802B, designed for slides having the new overall dimensions 302, 304 and/or aspect ratio of the converted slide. In addition, any applicable content or properties of the background objects on the slide 204, such as the text content of the text placeholder object 206A, may be copied to the corresponding background objects 806A from the new template or slide master 802B by the presentation application program 110. The result may be a converted slide having the new overall dimensions 302B and 304B, with the user-supplied foreground objects, such as content objects 206D-206E, dimensionally scaled and repositioned on the slide, and background objects 806A-806B and any background image 804B taken from the new template or slide master 802B, as illustrated in FIG. 8.

According to one embodiment, if no template or slide master 802B exists for the new overall dimensions 302, 304 and/or aspect ratio of the converted slide 204, the presentation application program 110 selects a template or slide master 802 designed for overall dimensions and/or aspect ratio closest to the new dimensions or aspect ratio of the converted slide. The background objects 806A-806B and any background image 804B from the selected slide master 802 may then be stretched or skewed in order to take up all the space on the converted slide 204, even if it results in a distortion or change in aspect ratio of the content in the background objects. A benefit of this approach is that it will reduce or eliminate the introduction of artifacts, such as whitespace around the edges of textured backgrounds, during the dimensional scaling process. In another embodiment, if no template or slide master 802B exists for the new overall dimensions 302, 304 and/or aspect ratio of the converted slide 204, the presentation application program 110 may scale and reposition the background objects from the original slide, such as content objects 206A-206B, using a method similar to that used for the foreground objects on the slide, such as content objects 206D-206E, as described herein.

While embodiments herein are described in terms of the dimensional conversion of slides 204 in a presentation 112 by a presentation application program 110, it will be appreciated that the embodiments described herein may be implemented by any software program that provides a drawing surface having a horizontal dimension 302 and a vertical dimension 304 upon which individual content objects 206 may be positioned for display and which provides a facility to dimensionally convert the drawing surface. For example, the embodiments described herein may be implemented by a drawing application, a diagramming application, a photo collage application, and the like.

Figure 9:
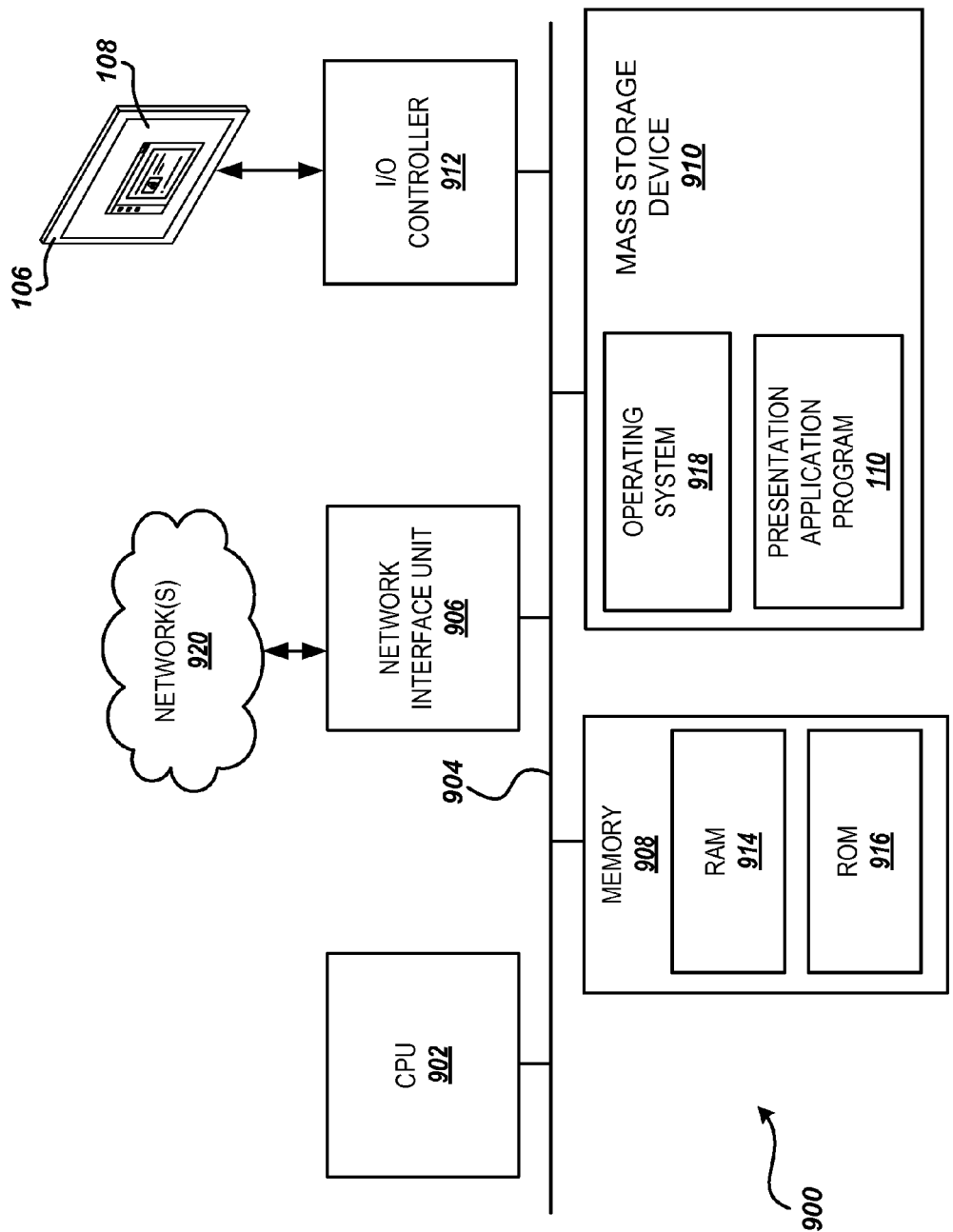
FIG. 9 is a block diagram showing an illustrative computer hardware and software architecture for a computing system capable of implementing aspects of the embodiments presented herein.

FIG. 9 shows an example computer architecture for a computer 900 capable of executing the software components described herein for converting presentations between differing slide dimensions and aspect ratios, in the manner presented above. The computer architecture shown in FIG. 9 illustrates a conventional desktop computer, laptop, notebook, PDA, wireless phone, server computer, or other computing device, and may be utilized to execute any aspects of the software components presented herein described as executing on the computer system 102 or other computing device.

The computer architecture shown in FIG. 9 includes one or more central processing units ("CPUs") 902. The CPUs 902 may be standard processors that perform the arithmetic and logical operations necessary for the operation of the computer 900. The CPUs 902 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 908, including a random access memory ("RAM") 914 and a read-only memory 916 ("ROM"), and a system bus 904 that couples the memory to the CPUs 902. A basic input/output system containing the basic routines that help to transfer information between elements within the computer 900, such as during startup, is stored in the ROM 916. The computer 900 also includes a mass storage device 910 for storing an operating system 918, application programs, and other program modules, which are described in greater detail herein.

The mass storage device 910 is connected to the CPUs 902 through a mass storage controller (not shown) connected to the bus 904. The mass storage device 910 provides non-volatile storage for the computer 900. The computer 900 may store information on the mass storage device 910 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 900 may store information to the mass storage device 910 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 900 may further read information from the mass storage device 910 by detecting the physical states or characteristics of one or more particular locations within the mass storage device.

As mentioned briefly above, a number of program modules and data files may be stored in the mass storage device 910 and RAM 914 of the computer 900, including an operating system 918 suitable for controlling the operation of a computer. The mass storage device 910 and RAM 914 may also store one or more program modules. In particular, the mass storage device 910 and the RAM 914 may store the presentation application program 110, which was described in detail above in regard to FIG. 1. The mass storage device 910 and the RAM 914 may also store other types of program modules or data.

In addition to the mass storage device 910 described above, the computer 900 may have access to other computer-readable media to store and retrieve information, such as program modules, data structures, or other data. It should be appreciated by those skilled in the art that computer-readable media may be any available media that can be accessed by the computer 900, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 900.

The computer-readable storage medium may be encoded with computer-executable instructions that, when loaded into the computer 900, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 900 by specifying how the CPUs 902 transition between states, as described above. According to one embodiment, the computer 900 may have access to computer-readable storage media storing computer-executable instructions that, when executed by the computer, perform the routines 400, 500, and 600 for converting presentations between differing slide dimensions and aspect ratios, described above in regard to FIGS. 4, 5, and 6.

According to various embodiments, the computer 900 may operate in a networked environment using logical connections to remote computing devices and computer systems through one or more networks 920, such as a LAN, a WAN, the Internet, or a network of any topology known in the art. The computer 900 may connect to the network 920 through a network interface unit 906 connected to the bus 904. It should be appreciated that the network interface unit 906 may also be utilized to connect to other types of networks and remote computer systems.

The computer 900 may also include an input/output controller 912 for receiving and processing input from a number of input devices, including a touchscreen 108, a keyboard, a mouse, a touchpad, an electronic stylus, or other type of input device. Similarly, the input/output controller 912 may provide output to a display device 106, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Figure 10:
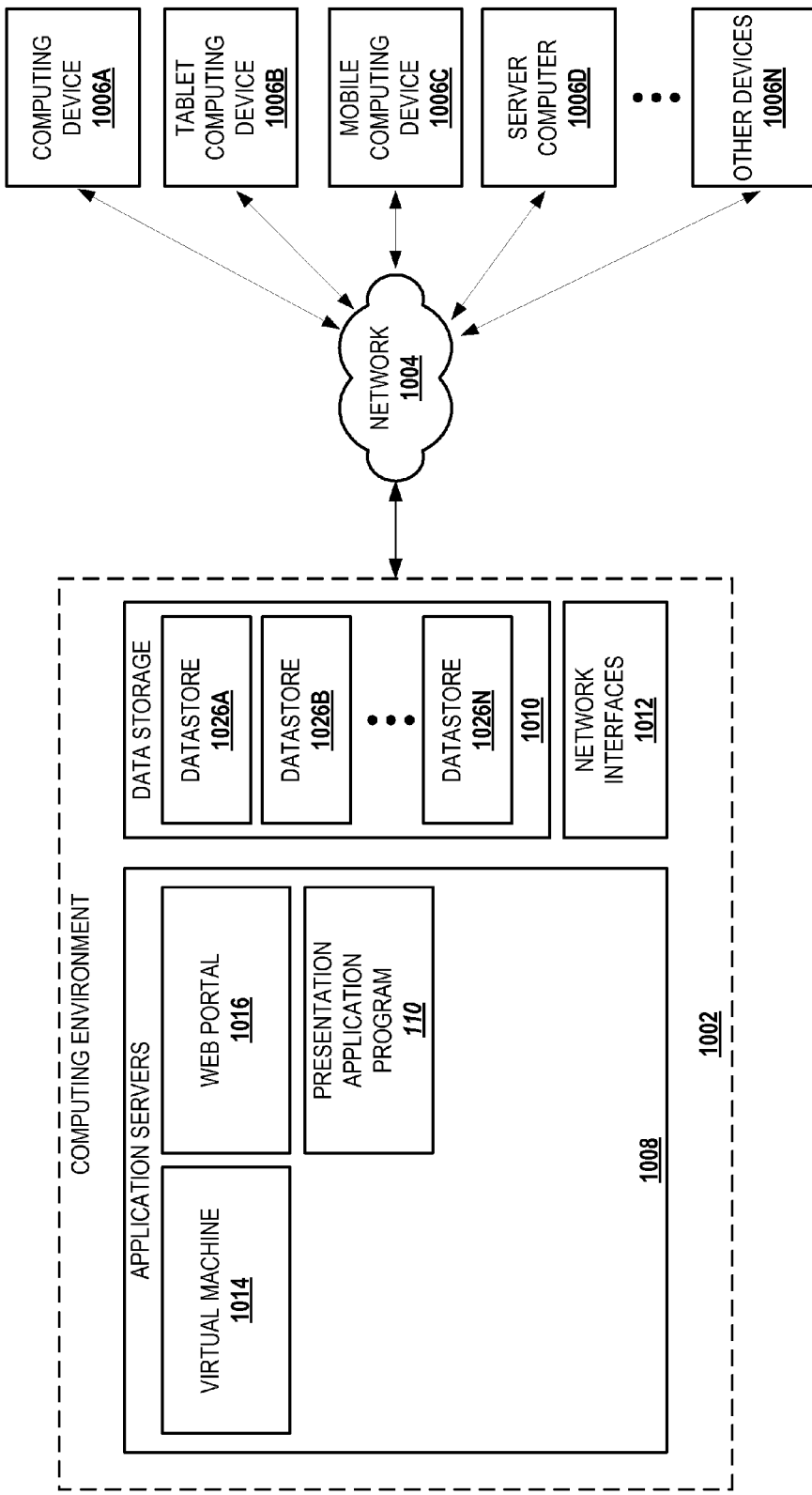
FIG. 10 is a block diagram illustrating a distributed computing environment capable of implementing aspects of the embodiments presented herein.

FIG. 10 illustrates an illustrative distributed computing environment 1000 capable of executing the software components described herein for converting presentations between differing slide dimensions and aspect ratios, in the manner presented above. The distributed computing environment 1000 illustrated in FIG. 10 can be used to provide the functionality described herein with respect to the computer system 102. The distributed computing environment 1000 thus may be utilized to execute any aspects of the software components presented herein.

According to various implementations, the distributed computing environment 1000 includes a computing environment 1002 operating on, in communication with, or as part of a network 1004. The network 1004 also can include various access networks. One or more client devices 1006A-1006N (hereinafter referred to collectively and/or generically as "clients 1006") can communicate with the computing environment 1002 via the network 1004 and/or other connections (not illustrated in FIG. 10). In the illustrated embodiment, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002. It should be understood that the illustrated clients 1006 and computing architectures illustrated and described herein are illustrative, and should not be construed as being limited in any way.

In the illustrated embodiment, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated embodiment, the application servers 1008 host one or more virtual machines 1014 for hosting applications or other functionality. According to various implementations, the virtual machines 1014 host one or more applications and/or software modules for providing the functionality described herein. It should be understood that this embodiment is illustrative, and should not be construed as being limiting in any way. The application servers 1008 also host or provide access to one or more Web portals, link pages, Web sites, and/or other information ("Web portals") 1016.

As shown in FIG. 10, the application servers 1008 also can host other services, applications, portals, and/or other resources. For example, the application servers 1008 may host the presentation application program 110 described above in regard to FIG. 1. As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. For example, the datastores 1026 may host the presentations 112 as described above in regard to FIG. 1.

The computing environment 1002 can communicate with, or be accessed by, the network interfaces 1012. The network interfaces 1012 can include various types of network hardware and software for supporting communications between two or more computing devices including, but not limited to, the clients 1006 and the application servers 1008. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the clients 1006. It should be understood that the clients 1006 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 1000 to utilize the functionality described herein for converting presentations between differing slide dimensions and aspect ratios.

Based on the foregoing, it should be appreciated that technologies for converting presentations between differing slide dimensions and aspect ratios are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for dimensionally converting slides in a presentation, the method comprising executing instructions in a computer system to perform the operations of:
   calculating a scaling factor based on a change in overall dimensions of a slide by
      calculating a horizontal ratio comprising a ratio of a new horizontal dimension of the slide to an old horizontal dimension of the slide,
      calculating a vertical ratio comprising a ratio of a new vertical dimension of the slide to an old vertical dimension of the slide, and
      selecting a lesser of the horizontal ratio and the vertical ratio as the scaling factor;
   scaling one or more content objects based on the scaling factor;

determining whether a content object of the one or more content objects is on the slide or is completely off-slide with respect to a first edge of the slide;

in response to determining that the content object of the one or more content objects is on the slide, repositioning the content object on the slide based on the scaling factor to maintain a relative distance between a position of the content object on the slide and a center of the slide; and in response to determining that the content object of the one or more content objects is completely off-slide, determining whether the first edge is a left edge, a right edge, a top edge, or a bottom edge, repositioning the content object by applying the scaling factor to a distance of the content object from the first edge.

2. The computer-implemented method of claim 1, wherein scaling the one or more content objects further comprises scaling a contents of one of the one or more content objects.

3. The computer-implemented method of claim 2, wherein scaling the content of the one of the one or more content objects comprises changing a paragraph spacing of text content based on the scaling factor.

4. The computer-implemented method of claim 2, wherein scaling the content of the one of the one or more content objects comprises changing a point size of text content of the content object based on the scaling factor.

5. The computer-implemented method of claim 1, wherein repositioning the content object on the slide comprises:
calculating a new horizontal coordinate for the position of the content object by multiplying the scaling factor by a distance between an old horizontal coordinate for the content object and an old center of the slide; and
calculating a new vertical coordinate for the position of the content object by multiplying the scaling factor by a distance between an old vertical coordinate for the content object and the old center of the slide.

6. The computer-implemented method of claim 1, further comprising repositioning a content object that is partially off-slide by applying the scaling factor to a distance of the content object from a second edge of the slide such that a same portion of the content object remains off-slide.

7. The computer-implemented method of claim 1, wherein an initial aspect ratio of the slide comprises 4:3 and wherein a final aspect ratio of the slide comprises 16:9.

8. A computer-readable storage medium comprising one or more of an optical disk, a solid state memory device, or a magnetic storage device and encoded with computer-executable instructions that, when executed by a computer, cause the computer to:
calculate a scaling factor based on a change in overall dimensions of a drawing surface comprising a content object by
calculating a horizontal ratio comprising a ratio of a new horizontal dimension of the drawing surface to an old horizontal dimension of the drawing surface,
calculating a vertical ratio comprising a ratio of a new vertical dimension of the drawing surface to an old vertical dimension of the drawing surface, and
selecting one of the horizontal ratio or the vertical ratio as the scaling factor;
scale the content object based on the scaling factor such that an aspect ratio of the content object remains constant;
determine whether the content object is on the drawing surface or is completely off-slide with respect to a first edge of the drawing surface;
in response to determining that the content object is on the drawing surface, reposition the content object on the drawing surface based on the scaling factor to maintain a relative distance between a position of the content object and a center of the drawing surface; and
in response to determining that the content object is completely off-slide, determining whether the first edge is a left edge, a right edge, a top edge, or a bottom edge, reposition the off-slide content object by applying the scaling factor to a distance of the off-slide content object from the first edge of the drawing surface.

9. The computer-readable storage medium of claim 8, wherein scaling the content object further comprises changing a property of text content of the content object based on the scaling factor.

10. The computer-readable storage medium of claim 8, wherein repositioning the content object on the drawing surface comprises:
calculating a new horizontal coordinate for the position of the content object by multiplying the scaling factor by a distance between an old horizontal coordinate for the content object and an old center of the drawing surface; and
calculating a new vertical coordinate for the position of the content object by multiplying the scaling factor by a distance between an old vertical coordinate for the content object and the old center of the drawing surface.

11. The computer-readable storage medium of claim 8, having further computer-executable instructions that, when executed by a computer, cause the computer to:
determine that a portion of the content object is located off-slide, and reposition the content object by applying the scaling factor to a distance of the content object from a second edge of the drawing surface such that a same portion of the content object remains off-slide.

12. The computer-readable storage medium of claim 9, wherein changing a property of text content of the content object based on the scaling factor comprises changing a paragraph spacing of text content based on the scaling factor.

13. The computer-readable storage medium of claim 9, wherein changing a property of text content of the content object based on the scaling factor comprises changing margins of a textbox based on the scaling factor.

14. An apparatus for dimensionally converting slides in a presentation, the apparatus comprising:
a processor; and
a computer-readable storage medium having computer-executable instructions stored thereupon which, when executed by the processor, cause the apparatus to
calculate a scaling factor based on a change in overall dimensions of a slide comprising a content object by
calculating a horizontal ratio comprising the ratio of a new horizontal dimension of the slide to an old horizontal dimension of the slide,
calculating a vertical ratio comprising the ratio of a new vertical dimension of the slide to an old vertical dimension of the slide, and
selecting one of the horizontal ratio or the vertical ratio as the scaling factor,
scale the content object based on the scaling factor such that an aspect ratio of the content object remains constant,
determine whether the content object is on the slide or is completely off-slide with respect to an edge of the slide;
in response to determining that the content object is on the slide, reposition the content object on the slide based on the scaling factor to maintain a relative distance between a position of the content object and a center of the slide; and in response to determining that the content object is completely off-slide, determining whether the edge is a left edge, a right edge, a top edge, or a bottom edge, reposition the content object by applying the scaling factor to a distance of the off-slide content object from the edge of the slide.

15. The apparatus of claim 14, wherein scaling the content object further comprises scaling a contents of the content object.

16. The apparatus of claim 15, wherein scaling the contents of the content object comprises changing a property of text contents of the content object based on the scaling factor.

17. The apparatus of claim 14, wherein repositioning the content object on the slide comprises:
calculating a new horizontal coordinate for the position of the content object by multiplying the scaling factor by a distance between an old horizontal coordinate for the content object and an old center of the slide; and
calculating a new vertical coordinate for the position of the content object by multiplying the scaling factor by a distance between an old vertical coordinate for the content object and the old center of the slide.

18. The apparatus of claim 14, wherein an initial aspect ratio of the slide comprises 4:3 and wherein a final aspect ratio of the slide comprise 16:9.

19. The apparatus of claim 16, wherein changing a property of text contents of the content object based on the scaling factor comprises changing a paragraph spacing of text content based on the scaling factor.

20. The apparatus of claim 16, wherein changing a property of text contents of the content object based on the scaling factor comprises changing margins of a textbox based on the scaling factor.

* * * * *